United States Patent [19]
Endo

[11] 3,719,839
[45] March 6, 1973

[54] DEVICE FOR MAGNETICALLY REGULATING EACH STOP POSITION OF AN INTERMITTENTLY ROTATING OUTPUT MEMBER

[75] Inventor: Yukio Endo, Matsudo, Japan

[73] Assignee: Kabushiki Kaisha Hattori Tokeitena, Tokyo, Japan

[22] Filed: March 23, 1971

[21] Appl. No.: 127,105

[30] Foreign Application Priority Data

March 25, 1970 Japan .................................. 45/27866

[52] U.S. Cl. ...................... 310/49, 58/116 M, 74/1.5
[51] Int. Cl. ............................................. H02k 37/00
[58] Field of Search ............... 74/1.5; 310/37, 49, 14; 58/116 M, 23 D

[56] References Cited

UNITED STATES PATENTS

| | | | |
|---|---|---|---|
| 2,548,731 | 4/1951 | Lehde | 310/49 |
| 2,416,081 | 2/1947 | Bakke | 188/158 UX |
| 2,834,896 | 5/1958 | Fisher | 310/49 |
| 3,596,119 | 7/1971 | Goldmann | 310/49 |

*Primary Examiner*—D. F. Duggan
*Attorney*—Robert E. Burns and Emmanuel J. Lobato

[57] ABSTRACT

An intermittently rotating indexing wheel is provided with a stop-position regulating device for regulating each successive stop position of the indexing wheel. The stop-position regulating device comprises a toothed wheel composed of magnetic material attached to the indexing wheel and a pair of magnetic members positioned in opposed relationship to the toothed wheel and suitably spaced-apart from each other a distance equal to a whole number multiple of the distance between two teeth on the toothed wheel. A permanent magnet is coupled to the pair of magnetic members and a magnetic circuit is established which includes the pair of magnetic members and the toothed wheel whereby each successive stop position of the toothed wheel and therefore that of the indexing wheel is precisely regulated.

5 Claims, 2 Drawing Figures

DEVICE FOR MAGNETICALLY REGULATING EACH STOP POSITION OF AN INTERMITTENTLY ROTATING OUTPUT MEMBER

The present invention relates to stop position-regulating means for timepieces wherein an intermittent rotary indexing wheel may be precisely stopped at a predetermined position after each incremental movement.

In the conventional stop position-regulating means for intermittent rotary indexing wheels of a timepiece, there is provided an indexing wheel composed of magnetic material and a permanent magnet arranged in opposition to the toothed portion of the indexing wheel so that the indexing wheel may be magnetically regulated at its stop position where any one tooth on the indexing wheel is brought into opposed alignment with the permanent magnet.

The conventional technique as above described, however, is disadvantageous since the magnetic path is left opened and the magnetic flux therefore leaks out of the magnetic path with the detrimental result that a feeble magnetic force is provided to accomplish the regulation. Moreover, the permanent magnet employed in such systems is subjected to deterioration due to aging.

The present invention is intended to provide a novel and improved stop position regulating means for an intermittent rotary wheel which overcomes the above disadvantages.

In accordance with the present invention, there is provided an improved means for magnetically regulating the stop position of an intermittent rotary wheel comprising an intermittent rotary wheel made of magnetic material, two members arranged in adjacent opposition to the intermittent rotary wheel and spaced apart from one another, a connecting plate interconnecting the two members with each other, and wherein at least any one of either the connecting plate or one of the two members is a permanent magnet.

Thus, a closed magnetic path having two narrow spaces existing between the intermittent rotary wheel and the two members is provided whereby the intermittent rotary wheel may be positively and precisely stopped at a predetermined position after each angular displacement of the wheel. Therefore, the intermittent rotary wheel is effectively prevented from undergoing excessive angular motion which may be otherwise caused by the inertia force of the wheel itself.

One object of the present invention is therefore to provide an improved stop position-regulating means for an intermittent rotary wheel which has a high degree of regulating accuracy and which is hardly subjected to any aging deterioration.

Other objects and characteristic features of the present invention will become evident and will be more readily understood by the following description and claims taken in conjunction with the accompanying drawings, in which:

Figure 1:
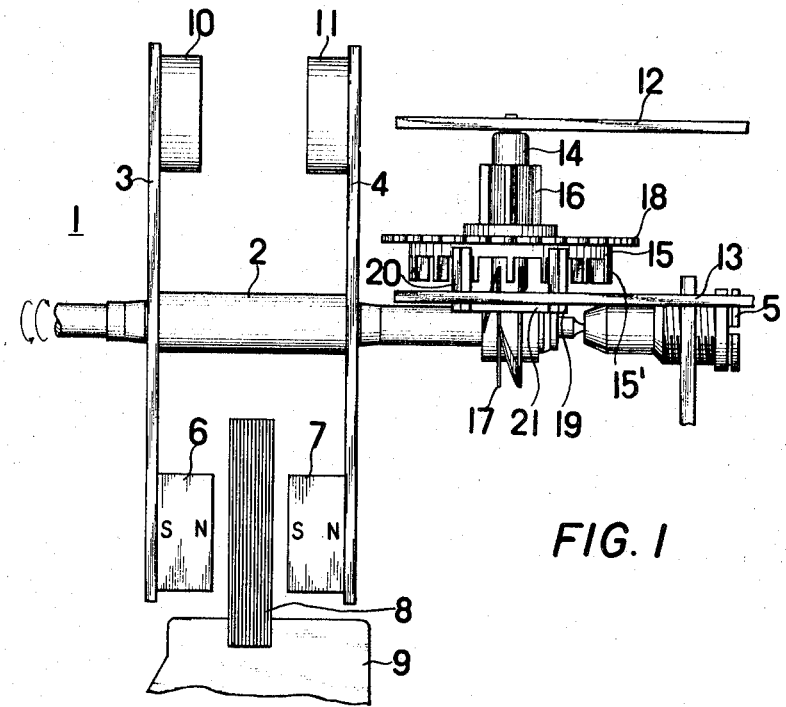
FIG. 1 is a plan view illustrating one embodiment of the present invention.
Figure 2:
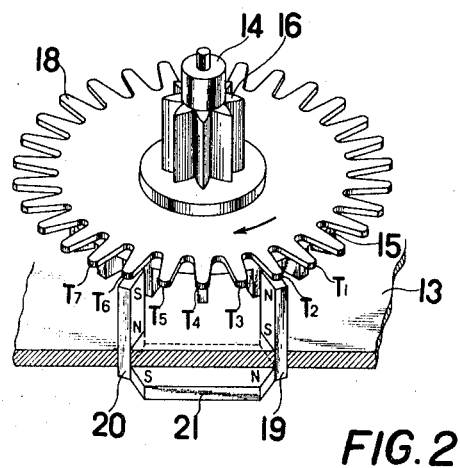
FIG. 2 is an enlarged perspective view, partly in cross-section, of the embodiment shown in FIG. 1.

Referring now to FIGS. 1 and 2, a balance device 1 comprises two balance wheels 3 and 4 mounted upon a rotatable balance staff 2. The balance staff 2 is provided with a balance screw 5 for selectively adjusting the axial position of the balance staff 2. In order to drive the balance device 1 in a reciprocating oscillatory manner, conventional magnetic driving means is employed and comprises a pair of magnets 6 and 7 secured in opposition to each other on the respective balance wheels 3 and 4. A pick-up and driving coil 8 is mounted on a support plate 9 and is disposed between the magnets 6 and 7 and coacts therewith to electromagnetically oscillate the balance staff 2. The electric circuitry for actuating the magnetic driving means has been omitted in the accompanying drawing and such circuitry is well-known in the art. A balancing mass 10 is secured to the balance wheel 3 and other balancing mass 11 is secured to the balance wheel 4 and these balancing masses are disposed in opposition to the respective magnets 6 and 7 to effectively balance the balance wheels.

An indexing wheel arbor 14 is rotatably journalled between an upper plate 12 and a middle plate 13 and has secured thereon a crown-shaped indexing wheel 15 and an indexing wheel pinion 16. The indexing wheel 15 is provided with a series of circumferentially spaced-apart depending projections 15' and the pinion 16 is provided with a set of gear teeth.

The balance staff 2 is further provided with a drive plate 17 engageable with the projections 15' to effect intermittent rotation of the indexing wheel 15 in response to oscillation of the balance staff 2. The indexing wheel 15 has coaxially mounted thereon a lock wheel 18 which is provided on the periphery thereof with a series of circumferentially spaced-apart teeth or radially extending projections $T_1, T_2, T_3 \ldots$. The lock wheel 18 is composed of a material, preferably paralloy, which has a high magnetic permeability.

Two elongated magnets 19 and 20 are press fitted in apertures located in the middle plate 13. In the embodiment disclosed, the magnets 19 and 20 are cunife or vicalloy magnets. The magnets 19 and 20 may also be made of ferrite, however in this instance, the magnets should be affixed to the middle plate 13 by means of a bonding material. The lower end portions of the magnets 19 and 20 are connected to a plate magnet 21 which is attached to the middle plate 13.

The elongated magnets 19 and 20 and the plate magnet are initially magnetized in the following manner. The magnetizable members 19, 20 and 21 are first arranged, as shown in the drawings, on the middle plate 13 and a conductive wire is then introduced between the members 19 and 20. Then a plate having a high magnetic permeability is placed atop the magnetizable members 19 and 20 whereby the conductive wire is enclosed by the magnetizable members 19, 20 and 21 and the plate having a high magnetic permeability.

Then a strong electric current pulse is fed through the conductive wire, thereby momentarily creating a strong magnetic field around the conductive wire. The magnetizable members 19, 20 and 21 are influenced by the strong magnetic field and are accordingly strongly magnetized. Subsequently, the plate of high magnetic permeability and the conductive wire are both removed and then the indexing wheel 15 and the other gear wheels are mounted on the middle plate 13 to form a gear-train.

The elongated magnets 19 and 20 are each arranged such that their end faces situated at their respective upper extremities lie in a common plane and are opposed to the path of travel of the teeth of the lock wheel 18 with a narrow space therebetween. The magnets 19 and 20 are suitably spaced-apart from each other and occupy a relative positional relationship such that when one of the magnets is opposed in aligned superposition to one tooth of the lock wheel 18, the other magnet is similarly opposed in aligned superposition to another tooth of the lock wheel.

The operation of the stop position-regulating means having the structure as described above will now be described.

The balance device 1 is driven in a well known manner by the magnetic driving means to undergo a reciprocating oscillatory movement as shown by the arrows in FIG. 1, through a predetermined angular range. The drive plate 17 secured on the balance staff 2 coacts with the indexing wheel 15 to intermittently rotate same in the direction of the arrow shown in FIG. 2. Accordingly, the lock wheel 18 coaxially mounted on the indexing wheel 15 is also intermittently rotated in the same direction.

In the position shown in FIG. 2, the two teeth $T_2$ and $T_6$ of the lock wheel 18 are respectively positioned alignment in opposition to the magnets 19 and 20. In this position, the magnets 19, 20 and 21 and the lock wheel 18 constitute a closed magnetic path including as a part thereof the two narrow air spaces existing between the magnets 19 and 20 and the respective teeth $T_2$ and $T_6$ of the lock wheel 18. Accordingly, the magnetic flux density between the magnets 19 and 20 and the lock wheel 18 is high and the lock wheel 18 is subjected to a powerful attractive force by the magnets 19 and 20 thereby ensuring that the lock wheel 18 precisely stops at its predetermined position.

Reciprocating rotational movement of the balance device 1 then causes the lock wheel 18 to angularly rotate through one pitch thereof in the direction of the arrow shown in FIG. 2 until the teeth $T_1$ and $T_5$ of the lock wheel 18 move to the position where they are respectively opposed to and aligned with the magnets 19 and 20. In this position of the lock wheel 18, the closed magnetic path is again established by the combination of the magnets 19, 20 and 21 with the lock wheel 18 and the lock wheel 18 is precisely stopped at its predetermined position.

Any time the lock wheel 18 tends to stop in a position other than one of its predetermined positions, the magnetic flux path of the magnetic circuit is accordingly lengthened due to an increased in length of the two air gaps. Under such conditions, an attractive force is exerted on the movable lock wheel 18 tending to move and position same such that two teeth T are aligned with respective ones of the magnets 19 and 20. Thus it will be understood that the lock wheel 18 is accurately stopped after each intermittent angular displacement of the indexing wheel 15 by the regulating effect of the magnets 19 and 20 cooperating with the toothed lock wheel 18. When the indexing wheel 15 arrives at one of its predetermined stop positions, two teeth T of the lock wheel 18 are in aligned opposition to the magnets 19 and 20 and the magnetic path is then effectively closed.

It is not absolutely necessary to make all the magnetizable members 19, 20 and 21 into permanent magnets, as in the above-described embodiment, and it is sufficient to make at least one of these members a permanent magnet.

It is preferable in the present invention that the middle plate 13 be composed of a non-magnetic material, such as aluminum or the like, to more effectively suppress the magnetic flux leakage from the magnets 19 and 20 and the connecting plate 21.

Although a toothed lock wheel 18 is employed in the embodiment disclosed herein, a disc-shaped lock wheel may be used instead. In this alternate embodiment, the lock wheel is continuously subjected to the attractive force of the magnets 19 and 20 with the attendant result that a braking force always exists whereby the lock wheel is accurately stopped at its predetermined position and prevented from undergoing excess rotation due to its own inertia. Thus, the rotary wheel is effectively regulated to make intermittent rotation with extreme accuracy.

What I claim and desire to secure by Letters Patent is:

1. A device for magnetically regulating the stop positions of an intermittently rotating output member comprising: an intermittently and rotationally driven output member; a lock wheel connected to and intermittently rotated by said output member and having a circular peripheral portion composed of a plurality of circumferentially and equidistantly spaced-apart radially extending magnetic projections; and stop-position regulating means coacting with said lock wheel for magnetically regulating each successive stop position of the intermittently rotated output member comprising a pair of spaced-apart magnetic members each having at least one planar end face, means positioning said pair of magnetic members a distance apart corresponding to a whole number multiple of the distance between two successive magnetic projections and positioning said magnetic members so that one planar end of each magnetic member lies in a common plane and lies in superposed alignment with successive ones of said magnetic projections during intermittent rotation of said lock wheel, means including said pair of magnetic members and said circular peripheral portion of said lock wheel defining a magnetic path having minimum reluctance whenever two of said magnetic projections simultaneously directly align in superposition with said pair of magnetic members, and means establishing a magnetic flux in said magnetic path effective to precisely stop said lock wheel in successive stop positions defined by the simultaneous aligned superposition of the two magnetic projections with said pair of magnetic members to thereby effect precise stopping of said intermittently rotated output member in each successive stop position.

2. A device according to claim 1; wherein said means defining a magnetic path includes a magnetic plate member interconnecting said pair of magnetic members.

3. A device according to claim 2; wherein said means establishing a magnetic flux comprises a permanent magnet constituting at least one of said magnetic members.

4. A device according to claim 2; including a support plate composed of non-magnetic material, and means mounting said pair of magnetic members and said magnetic plate member on said support plate.

5. A device according to claim 1; wherein said output member comprises a balance staff; and means including an indexing wheel concentrically affixed to said lock wheel for effecting intermittent rotation of said lock wheel in response to intermittent rotation of said balance staff.

* * * * *